US009877498B2

(12) United States Patent
Walther et al.

(10) Patent No.: US 9,877,498 B2
(45) Date of Patent: Jan. 30, 2018

(54) SYSTEM AND METHOD FOR PRODUCING AN EXTRUDED PROTEIN PRODUCT

(71) Applicant: GENERAL MILLS, INC., Minneapolis, MN (US)

(72) Inventors: Goeran Walther, Plymouth, MN (US); Bernhard H. van Lengerich, Plymouth, MN (US); Steven C. Robie, Plymouth, MN (US); James N. Weinstein, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 14/308,118

(22) Filed: Jun. 18, 2014

(65) Prior Publication Data
US 2015/0044334 A1     Feb. 12, 2015

Related U.S. Application Data

(63) Continuation-in-part of application No. PCT/US2013/054145, filed on Aug. 8, 2013.

(51) Int. Cl.
*A23J 3/26* (2006.01)
*A47J 9/00* (2006.01)
(Continued)

(52) U.S. Cl.
CPC . *A23J 3/26* (2013.01); *A23J 3/04* (2013.01); *A23J 3/14* (2013.01); *A23J 3/227* (2013.01);
(Continued)

(58) Field of Classification Search
CPC .... A23J 3/227; A23J 3/26; A23J 3/265; A23J 3/04; A23J 3/14; A23L 1/0076; A47J 9/007; B29K 2089/00; A23P 30/20
(Continued)

(56) References Cited

U.S. PATENT DOCUMENTS 3,559,561 A * 2/1971 Page .................. A23J 3/227
100/145
3,814,823 A * 6/1974 Yang et al. ............ A23J 3/22
426/496
(Continued)

FOREIGN PATENT DOCUMENTS

| AU | 6566974 | 8/1975 |
| EP | 1 778 030 | 3/2006 |

(Continued)

OTHER PUBLICATIONS

Steel et al., "*Thermoplastic Extrusion in Food Processing*", Thermoplastic Elastomers, ISBN 978-953-51-0346-2, Chapter 13, pp. 265-290, Mar. 2012.
(Continued)

*Primary Examiner* — Seyed Masoud Malekzadeh
(74) *Attorney, Agent, or Firm* — Diederiks & Whitelaw, PLC; Rachel A. Khaler

(57) ABSTRACT

The present disclosure relates to systems and methods for producing an extruded protein product. In particular, a system for making an extruded protein product using a system that includes a die including channel having a transverse cross section that is a continuous loop along at least a portion of the length of the die is disclosed.

21 Claims, 8 Drawing Sheets

(51) Int. Cl.
*B29C 47/00* (2006.01)
*A23J 3/04* (2006.01)
*A23J 3/14* (2006.01)
*A23J 3/22* (2006.01)
*A23P 30/20* (2016.01)
*A23L 33/17* (2016.01)
*B29L 31/00* (2006.01)

(52) U.S. Cl.
CPC ............. *A23L 33/17* (2016.08); *A23P 30/20* (2016.08); *A47J 9/007* (2013.01); *B29C 47/0004* (2013.01); *A23J 3/265* (2013.01); *B29K 2089/00* (2013.01); *B29L 2031/748* (2013.01)

(58) Field of Classification Search
USPC ...................................................... 425/376.1
See application file for complete search history.

(56) References Cited

U.S. PATENT DOCUMENTS

| | | | | |
|---|---|---|---|---|
| 3,840,679 | A * | 10/1974 | Leipa et al. | A23J 3/22 426/104 |
| 3,925,566 | A | 12/1975 | Reinhart et al. | |
| 4,001,441 | A * | 1/1977 | Liepa | A23J 3/22 426/104 |
| 4,216,240 | A * | 8/1980 | Shirai | A23J 3/227 426/512 |
| 4,910,040 | A * | 3/1990 | Sagarino | A23J 3/26 426/516 |
| 4,959,240 | A * | 9/1990 | Aulik | A23J 3/14 426/578 |
| 5,534,278 | A * | 7/1996 | De Ruyter | A23J 3/227 426/237 |
| 5,565,234 | A | 10/1996 | Teraguchi et al. | |
| 5,635,237 | A * | 6/1997 | Greenberg | A23K 40/20 426/284 |
| 5,916,616 | A * | 6/1999 | Kuwada | A23L 7/109 426/451 |
| 5,919,509 | A | 7/1999 | Cremers et al. | |
| 5,922,392 | A | 7/1999 | Kelly et al. | |
| 6,627,241 | B1 | 9/2003 | Demars et al. | |
| 6,632,466 | B2 * | 10/2003 | Roussel | A23P 30/25 426/284 |
| 6,817,858 | B2 | 11/2004 | Howsam | |
| 8,293,297 | B2 * | 10/2012 | Orcutt | A23J 3/26 425/376.1 |
| 2001/0019732 | A1 * | 9/2001 | Roussel | A23P 30/25 426/89 |
| 2002/0061343 | A1 * | 5/2002 | Horna | A21C 11/163 425/375 |
| 2002/0084281 | A1 * | 7/2002 | Horna | A21C 3/08 222/1 |
| 2004/0185158 | A1 * | 9/2004 | McHugh | A21C 11/163 426/496 |
| 2004/0247760 | A1 | 12/2004 | Howsam | |
| 2005/0064087 | A1 | 3/2005 | Richey et al. | |
| 2007/0207240 | A1 | 9/2007 | Hansen et al. | |
| 2007/0269567 | A1 | 11/2007 | McMindes et al. | |
| 2007/0269583 | A1 | 11/2007 | McMindes et al. | |
| 2008/0248167 | A1 | 10/2008 | McMindes et al. | |
| 2008/0254167 | A1 * | 10/2008 | McMindes | A23J 3/16 426/72 |
| 2008/0254168 | A1 * | 10/2008 | Mueller | A23J 3/16 426/72 |
| 2008/0254199 | A1 * | 10/2008 | Orcutt | A23J 3/26 426/656 |
| 2008/0260913 | A1 * | 10/2008 | Orcutt | A23J 3/16 426/92 |
| 2009/0291188 | A1 | 11/2009 | Milne et al. | |
| 2010/0074998 | A1 * | 3/2010 | Espeleta Vega | A23J 3/14 426/92 |
| 2011/0014311 | A1 * | 1/2011 | Holmes | A01J 27/04 425/112 |
| 2012/0093994 | A1 | 4/2012 | Hsieh et al. | |

FOREIGN PATENT DOCUMENTS

| | | |
|---|---|---|
| EP | 1 059 040 | 9/2006 |
| JP | 01281917 | 11/1989 |
| JP | 037559 | 1/1991 |
| WO | WO-03/007729 | 1/2003 |
| WO | WO 2011/053786 | 5/2011 |

OTHER PUBLICATIONS

StaMixCo, "*SMB Extrusion Melt Blender*" Bulletin SMB-3.1, Feb. 9, 2007.

Aoki et al., "Texturization of Surimi using a Twin-Screw Extruder", Nippon Shokuhin Kogyo Gakkaishi, 36(9):748-53 (1989).

Cheftel et al., "New protein texturization process by extrusion cooking at high moisture levels", Food Reviews International, 8(2):235-75 (1992).

Gwiazda et al., "Microstructure studies of texturized vegetable protein products: Effects of oil addition and transformation of raw material in various sections of a twin screw extruder", Food Microstructure, 6:57-61 (1987).

Isobe et al. ,"High Moisture Extrusion with a Twin-Screw Etruder: Fate of Soy Protein during the Repetition of Extrusion Cooking" Nippon Shokuhin Kogoyo Gakkaishi, 34:456-61 (1987) Abstract.

Megard et al., "Continuous Restructuring of Mechanically Deboned Chicken Meat by HTST Extrusion-Cooking", Journal of Food Science, 50:1364-9 (1985).

Noguchi, "Extrusion cooking of high moisture protein foods", Extrusion Cooking, American Association of Cereal Chemists, Ed. Mercier, Linko, and Harper, Chapter 11, (1989).

Thiebaud et al., "Influence of Process Variables on the Characteristics of a High Moisture Fish Soy Protein Mix Texturized by Extrusion Cooking" Lebensm.-Wiss. U.-Technol., 29:526-35 (1996).

* cited by examiner

SYSTEM AND METHOD FOR PRODUCING AN EXTRUDED PROTEIN PRODUCT

RELATED APPLICATIONS

This application is a Continuation-In-Part of International Application No. PCT/US2013/054145, filed Aug. 8, 2013, the entire disclosure of which is incorporated herein by reference.

TECHNOLOGY

The present disclosure generally relates to systems and methods for producing an extruded protein product.

BACKGROUND

Recent developments in extrusion have allowed for the production of extruded protein products made from animal derived and/or non-animal derived protein sources that have oriented fibers that are texturally similar to meat. Although taste and texture of such extruded protein products is approaching that of meat, thus far the rate of production has been limited. Thus, there is a need for methods and systems that can be used to produce an extruded protein product having oriented fibers at more commercially acceptable rates.

SUMMARY

Provided herein is a system for producing an extruded protein product. The system includes an extruder configured to produce a stream comprising a proteinaceous composition having a protein component that can form oriented fibers, where the composition has a protein content of about 15% to about 90% based on dry weight of the composition, the stream having a moisture content of at least 27%; and an elongated die having an internal longitudinal channel configured to receive the stream from the extruder, the longitudinal channel having a transverse cross-section that is a continuous loop along at least a portion of the length of the die, where the channel has a length and gap thickness configured to form oriented fibers from the protein component in a generally parallel orientation to produce the extruded protein product.

In some embodiments, the channel has a transverse cross-section that is a simple closed curve. The transverse cross-section of the channel can be substantially elliptical, or substantially circular.

In some embodiments, the channel has inner and outer surfaces that are substantially concentric.

In some embodiments, the ratio of the length of the channel to the gap thickness of the channel can be between about 30:1 and about 1000:1, between about 40:1 and about 240:1, between about 50:1 and about 160:1, or between about 60:1 to about 140:1.

In some embodiments, the gap thickness of the channel can be between about 2 mm to about 100 mm, between about 5 mm to about 60 mm, or between about 10 mm and about 30 mm.

In some embodiments, the outer diameter of the channel can be between about 130 mm and about 1000 mm, between about 160 mm and about 750 mm, or between about 200 mm and about 500 mm.

In some embodiments, the channel can have a generally constant cross-section along substantially its entire length.

In some embodiments, the elongated die can include a cooling apparatus inside and outside of the longitudinal channel.

In some embodiments, the moisture content of the proteinaceous composition can be from about 27% to about 85%.

In some embodiments, the die can be modular.

In some embodiments, the system can further include a transition apparatus between the extruder and the die. The transition apparatus can be configured to substantially evenly distribute a stream into the continuous loop of the channel. In some embodiments, the transition apparatus includes a generally cone shaped apparatus to distribute the stream. In some embodiments the transition apparatus can be configured to split a stream into two or more substreams in order to distribute the stream.

In some embodiments, the transition apparatus can be configured to pre-align portions of the stream to facilitate texturization.

In some embodiments, the transition apparatus can include a static mixer. The static mixer can be configured to at least partially mix an additive into the stream. In some embodiments, the static mixer can be configured to incompletely mix the additive into the stream.

Provided herein is a method for producing an extruded protein product having fibers that are oriented in a generally parallel orientation. The method includes producing a stream comprising a proteinaceous composition having a protein component that can form oriented fibers, where the proteinaceous composition has a protein content of about 15% to about 90% based on dry weight of the proteinaceous composition, and where the stream has a moisture content of at least 27%; and directing the stream through an elongated channel of a die to form oriented fibers from the protein component in a generally parallel orientation to form the extruded protein product, where the elongated channel has a transverse cross-section that is a continuous loop such that the extruded protein product exits the die having a transverse cross-section that is a continuous loop.

In some embodiments, the elongated channel can have a gap thickness and a longitudinal length. The ratio of the length of the channel to the gap thickness of the channel can be between about 30:1 and about 1000:1, between about 40:1 and about 240:1, between about 50:1 and about 160:1, or between about 60:1 to about 140:1.

In some embodiments, the temperature of the extruded protein product upon exiting the channel can be between about 40° C. to about 110° C., between about 55° C. to about 90° C., or between about 70° C. to about 85° C.

In some embodiments, the temperature of the stream upon entering the channel is between about 90° C. to about 180° C., between about 100° C. to about 155° C., or between about 115° C. to about 120° C.

In some embodiments, the extruded protein product can be made at a rate of at least 400 kg/hr.

In some embodiments, the protein can include a non-animal derived protein.

In some embodiments, the method can further include directing the stream through a transition apparatus.

In some embodiments, the method can further include directing the stream through a static mixer.

In some embodiments, the method can further include at least partially mixing an additive into the stream. The additive can be incompletely mixed into the stream. The additive can include one or more of a lipid, a coloring agent, a hydrocolloid, a carbohydrate, a softener or polyol, an enzyme, a pH adjusting agent, a salt, a macronutrient, or a micronutrient. In some embodiments, the additive can provide a desired appearance or function in the extruded protein product.

In some embodiments, the stream can be substantially evenly distributed by the transition apparatus into the continuous loop of the channel. In some embodiments, the transition apparatus can include a generally cone shaped apparatus to distribute the stream. In some embodiments, the transition apparatus can split the stream into two or more substreams in order to distribute the stream.

In some embodiments, the transition apparatus can pre-align portions of the stream to facilitate texturization.

Also provided herein is an extruded protein product made by a method provided herein.

These and various other features and advantages will be apparent from a reading of the following detailed description.

DETAILED DESCRIPTION

While extrusion technology has begun to produce protein products that have an enjoyable texture, while reducing or eliminating the use of animal protein, production rates have generally been limited by the need to maintain a desired texture. Some consumers desire such products to have a texture that mimics meat. One way to achieve such a desired texture in an extruded protein product is to form generally parallel oriented fibers from a protein component in the product. Surface shear in a cooling die channel during the extrusion process can contribute to formation of parallel oriented fibers. However, uneven shear can be caused by traditional cooling die channels that typically have a rectangular cross-section due to concentration of shear at the sides of the rectangle, resulting in lower quality of an extruded product particularly at higher speeds. Round cooling die channels, on the other hand, can present challenges in texturizing and/or cooling the center of the product during the extrusion process, especially at larger diameters. Further, adjusting the length of a cooling die channel in order to improve texturization and/or cooling typically results in extrusion difficulties due to pressure drops as a channel is lengthened.

As described herein, it has been discovered that a die with a longitudinal channel having a transverse cross-section that is a continuous loop can be used not only to produce a high quality extruded protein product with generally parallel oriented fibers, but can do so at a relatively high rates. It has been discovered that a die channel with a continuous loop cross section can provide a more uniform shear rate to form a desired texture than a channel that has discrete sides by eliminating the sides.

It has also been discovered that, by adjusting the ratio between the thickness of a channel having a continuous loop cross section and the length of the channel, extruded protein product quality can be maintained while maintaining a relatively high production rate despite an expected drop in pressure. Surprisingly, a method described herein can produce an extruded protein product at a rate of at least about 400 kg/hr (e.g., about 400 kg/hr to about 1600 kg/hr, preferably about 450 kg/hr to about 7000 kg/hr, and more preferably about 500 kg/hr to about 13000 kg/hr, and the like) or more, depending on the capacity of an extruder used to supply extrudate to the die.

Figure 8:
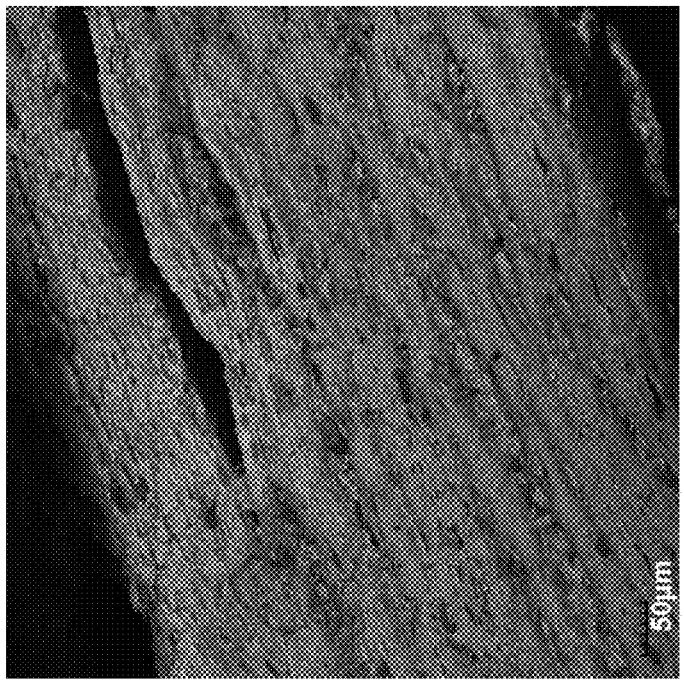
FIG. 8 shows confocal photomicrographs of an extruded protein product having oriented fibers at 20× magnification.
Figure 8:
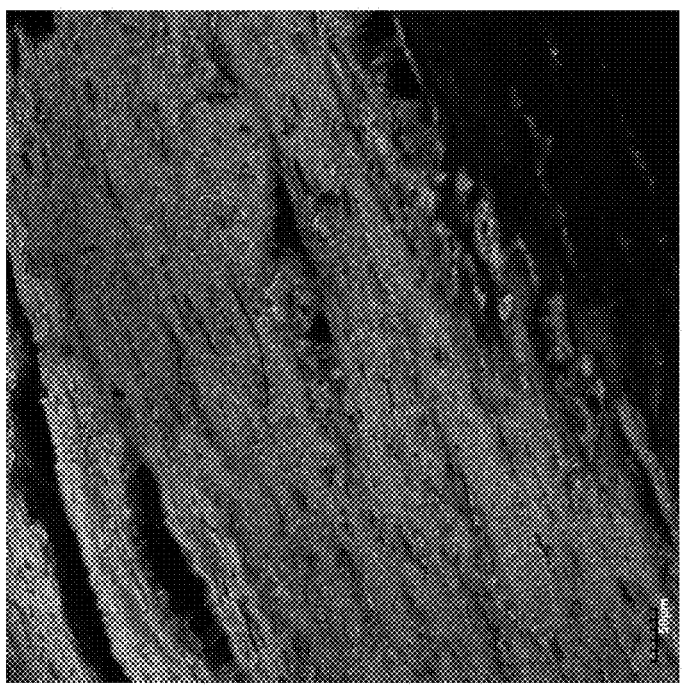

An extruded protein product having oriented fibers provided herein is produced by extruding a proteinaceous composition having a protein component that can form oriented fibers. A protein component in a proteinaceous composition can form fibers that can be oriented as desired to produce an extruded protein product. The fibers can be oriented in a generally parallel orientation, but need not be oriented linearly. In some embodiments, fibers that are oriented in a generally parallel orientation can be oriented in linear (e.g., longitudinal in the direction of extrusion) or curved manner. The fibers need not be perfectly parallel and can overlap and still provide a desired texture to an extruded protein product. In some embodiments, fibers in an extruded protein product provided herein can be oriented such that they impart a substantially meat-like structure to the extruded protein product. As used herein, an extruded protein product has a substantially meat-like structure if it has a structure that is similar in texture to raw or cooked animal meat. An extruded protein product provided herein typically has a protein content of from about 15% to about 90% (e.g., from about 20% to about 80%, from about 30% to about 75%, from about 40% to about 85%, and the like) based on dry weight, a moisture content greater than 27%, and elongated protein fibers arranged in a generally parallel arrangement. The density and length of elongated protein fibers in an extruded protein product can be adjusted to produce structures similar to different kinds of meat, such as chicken, beef, lamb, pork, fish, and the like. It is to be understood, however, that an extruded protein product provided herein need not have a structure identical to or indistinguishable from meat. Examples of extruded protein products having generally parallel oriented fibers are shown in FIG. 8.

A process for making an extruded protein product provided herein can include production of a stream comprising a proteinaceous composition having a protein component that can form oriented fibers. A proteinaceous composition, as used herein, includes at least one protein component and water. A protein component includes at least one non-animal derived protein, animal derived protein, or mixtures thereof. A non-animal derived protein can be derived from any appropriate non-animal source (e.g., plant, algae, bacteria, fungi, yeast, and the like). Examples of non-animal derived proteins include, but are not limited to, crude mixtures of proteins (e.g., grain flour, legume flour, yeast extract, algae extract, and the like), or partially or fully purified proteins in the form of protein concentrates or protein isolates (e.g., zein, gluten, soy protein isolate, soy protein concentrate, and the like). An animal derived protein can be derived from any appropriate animal source (e.g., meat, egg, dairy, and the like) from any appropriate animal (e.g., poultry, bovine animals, pigs, horses, fish, sheep, goats, deer, and the like).

Examples of animal derived proteins include, but are not limited to, crude mixtures of proteins (e.g., mechanically deboned meat, surimi, minced meat, meat paste, and the like), or partially or fully purified proteins (e.g., gelatin, casein, whey, albumin, milk protein isolate, and the like). An animal derived or non-animal derived protein for use in a process provided herein can be a derivative (e.g., isomer, hydrolysate, salt form) of a natural protein.

The protein content of a proteinaceous composition suitable for use in the methods provided herein can range from about 15% of the weight of the dry ingredients to about 90% of the weight of the dry ingredients. For example, based on the dry weight of the proteinaceous composition, the protein content of a proteinaceous composition can be from about 20% to about 80% or from about 30% to about 85%, and the like. The amount of protein and/or type of protein in a proteinaceous composition can be adjusted in order to adjust the protein content or texture of an extruded protein product produced from the proteinaceous composition. In some embodiments, the protein content in a proteinaceous composition can be adjusted in order to adjust the viscosity, gelling properties, water binding properties, oil binding properties, emulsifying properties, or shear properties of the proteinaceous composition. In some embodiments, the type of a protein component included in a proteinaceous composition can determine the protein content of a proteinaceous composition. For example, a proteinaceous composition including soy protein concentrate, which has a protein content of about 70% by dry weight, in an amount of about 65% by weight of the dry ingredients can have a protein content of about 45% by weight of the dry ingredients. However, a proteinaceous composition including soy protein isolate, which has a protein content of about 90% by dry weight, in an amount of about 65% by weight of the dry ingredients can have a protein content of about 58% by weight of the dry ingredients.

A proteinaceous composition suitable for use in the methods provided herein can have a moisture content of at least 27% by weight of the proteinaceous composition. For example, the moisture content can be from about 27% to about 85%, from about 30% to about 70%, from about 40% to about 70%, from about 50% to about 65%, and the like. The moisture content of a proteinaceous composition can be adjusted in order to adjust the moisture content or texture of an extruded protein product produced from the proteinaceous composition. In some embodiments, the moisture content in a proteinaceous composition can be adjusted in order to adjust the viscosity or shear properties of the proteinaceous composition to result in the desired hardness, cohesiveness, springiness, and/or chewiness of an extruded protein product made using the proteinaceous composition. In some embodiments, the moisture content in a proteinaceous composition can be adjusted in order to adjust the solubility of one or more other components in the proteinaceous composition.

In some embodiments, a proteinaceous composition suitable for use in the methods provided herein, also includes one or more other components including, without limitation, a carbohydrate component, a lipid component, a pH adjusting agent, a flavoring agent, a coloring agent, a macronutrient, a micronutrient, a vitamin, a mineral, and the like. The amount and type of additional components in a proteinaceous composition can be adjusted in order to adjust the nutritional value, flavor, aroma, color, appearance and/or texture of an extruded protein product produced from the proteinaceous composition. In some embodiments, the amount and type of additional components in a protein composition can be adjusted in order to adjust the viscosity, gelling properties, water binding properties, oil binding properties, emulsifying properties, or shear properties of the proteinaceous composition. In some embodiments, the amount and type of additional components in a proteinaceous composition can be adjusted in order to adjust the solubility of one or more other components in the proteinaceous composition.

Protein compositions suitable for use in the methods provided herein can be found at, for example, U.S. Pat. No. 5,922,392, U.S. Patent Pub. No. 2007/0269583, U.S. Patent Pub. No. 2009/0291188, U.S. Patent Pub. No. 2012/0093994, EP1778030, EP1059040, and WO 2003/007729, all of which are incorporated by reference herein. Additional proteinaceous compositions suitable for use in the methods provided herein can be found in "Continuous restructuring of mechanically deboned chicken meat by HTST extrusion cooking" (Megard et al., Journal of Food Science, 50:1364-9 (1985)), "High moisture extrusion with a twin-screw extruder: Fate of soy protein during the repetition of extrusion cooking" (Isobe and Noguchi, Nippon Shokuhin Kogoyo Gakkaishi, 34:456-61 (1987)), "Microstructure studies of texturized vegetable protein products: Effects of oil addition and transformation of raw material in various sections of a twin screw extruder" (Gwiazda et al., Food Microstructure, 6:57-61 (1987)), "Texturization of surimi using a twin-screw extruder" (Aoki et al., Nippon Shokuhin Kogyo Gakkaishi, 36(9):748-53 (1989)), "Extrusion cooking of high moisture protein foods" (Noguchi, in Extrusion Cooking, American Association of Cereal Chemists, Ed. Mercier, Linko, and Harper (1989)), "New protein texturization process by extrusion cooking at high moisture levels" (Cheftel et al., Food Reviews International, 8(2):235-75 (1992)), and "Influence of process variables on the characteristics of a high moisture fish soy protein mix texturized by extrusion cooking" (Thiebaud et al., Lebensm.-Wiss. U.-Technol., 29:526-35 (1996)), all of which are incorporated by reference herein.

A stream comprising a proteinaceous composition can be produced using any appropriate method and equipment. For example, in some embodiments, a stream can be produced using an extruder. An extruder suitable for use in the methods provided herein can include, for example, a single screw, twin, or triple screw extruder, or a ring extruder. For example a co-rotating, intermeshing, twin screw extruder can be used in a method provided herein. Manufacturers for co-rotating twin screw extruders include, for example, Coperion, Wenger, Clextral, Bersttorf, APV, Buhler, and Leistritz. Manufacturers for single screw extruders include, for example, Wenger, APV, and Buhler.

In some embodiments, a stream can be produced via, e.g., a pump from an outlet on a container containing a protein composition.

Temperature and/or viscosity of a stream can be adjusted to adjust flow behavior, flow balance, or other stream properties, such as melting of protein in an extruder, and/or cooling, gelling, setting, and structure formation in the die. For example, a stream can have a temperature of from about 20° C. to about 210° C. In some embodiments, a stream can have a temperature from about 100° C. to about 150° C. In some embodiments, a stream can have a temperature of from about 50° C. to about 160° C., from about 70° C. to about 145° C., or the like.

Figure 1:
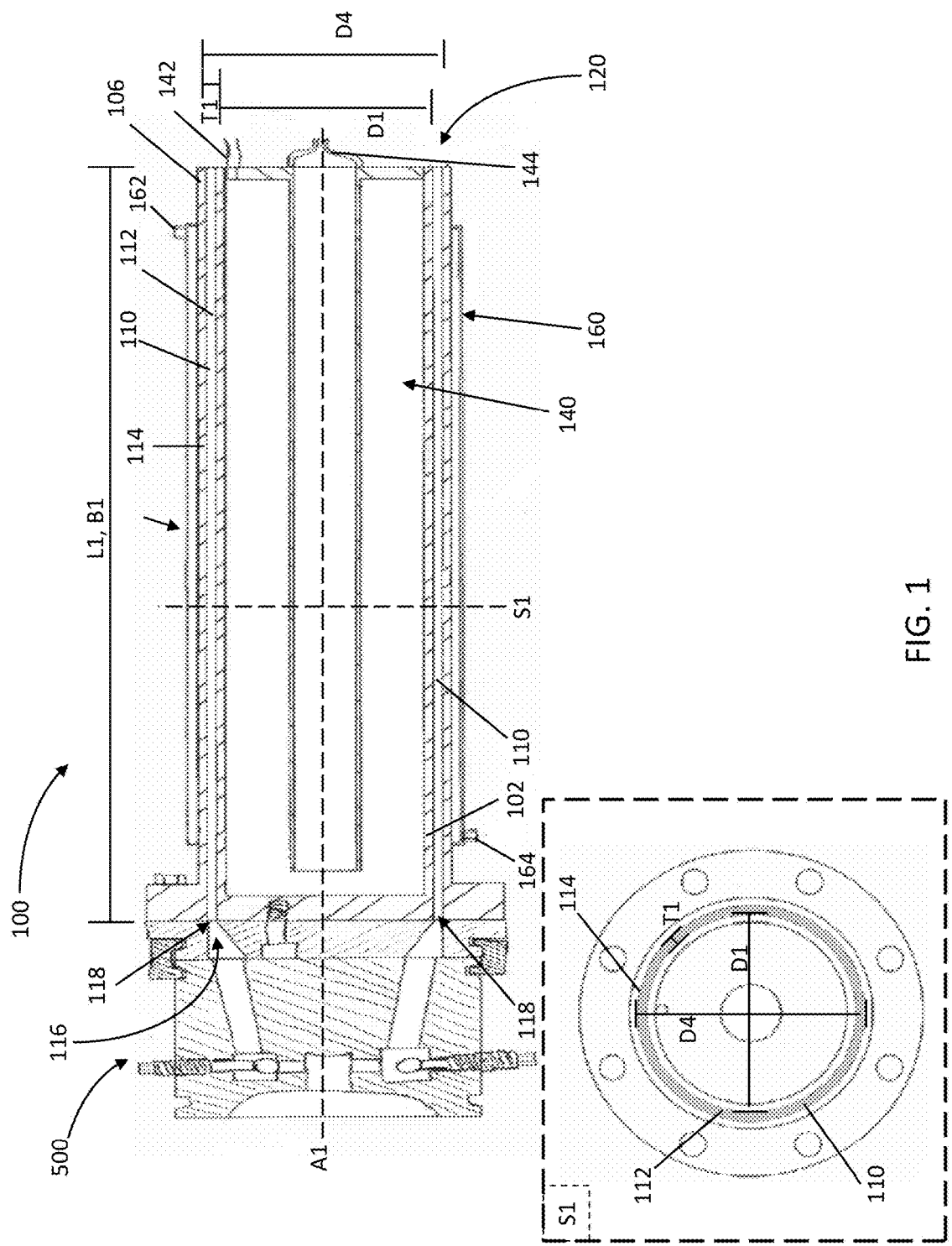
FIG. 1 shows a die according to an embodiment. A cross section is shown in the inset.
Figure 2:
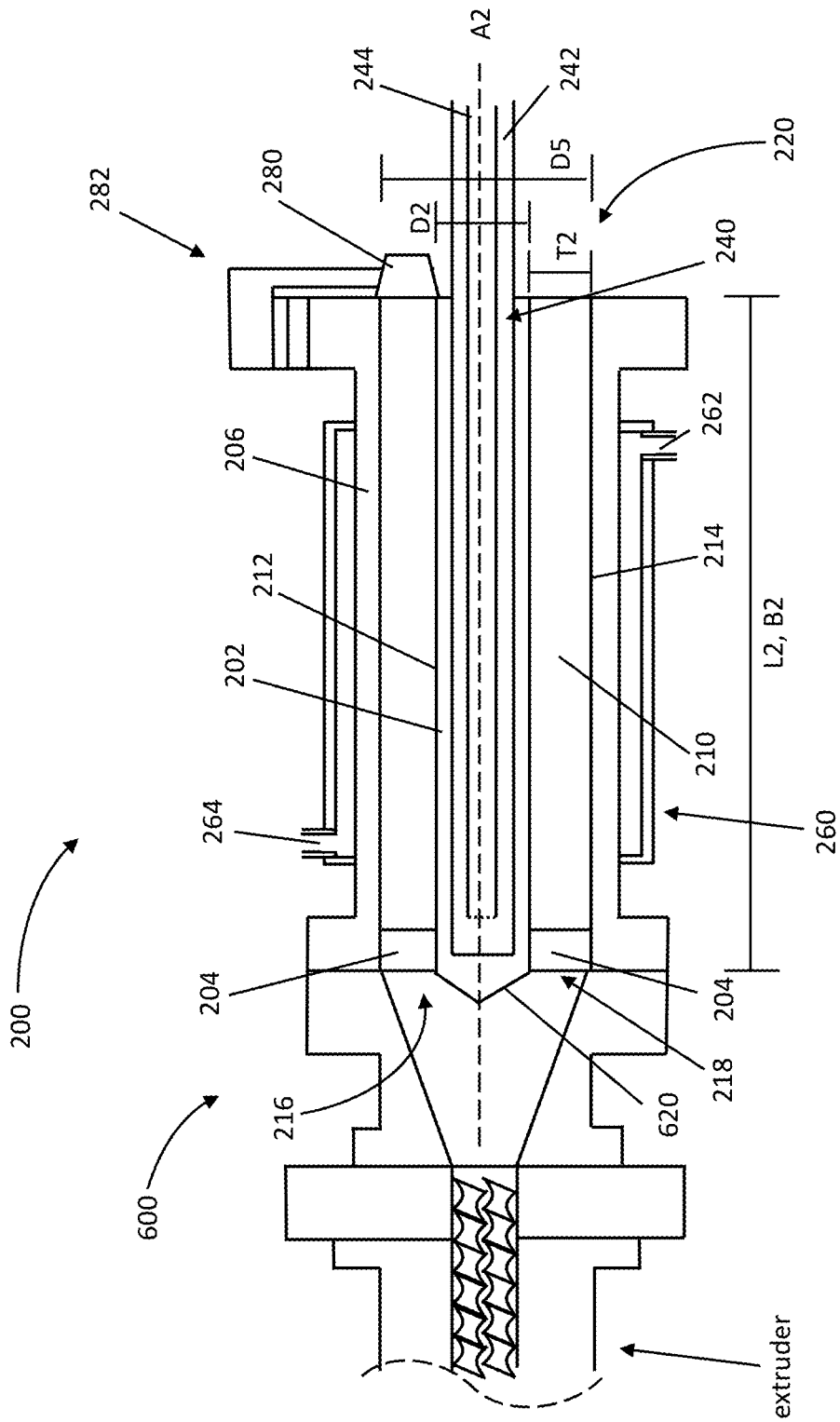
FIG. 2 shows a die according to an embodiment.
Figure 3:
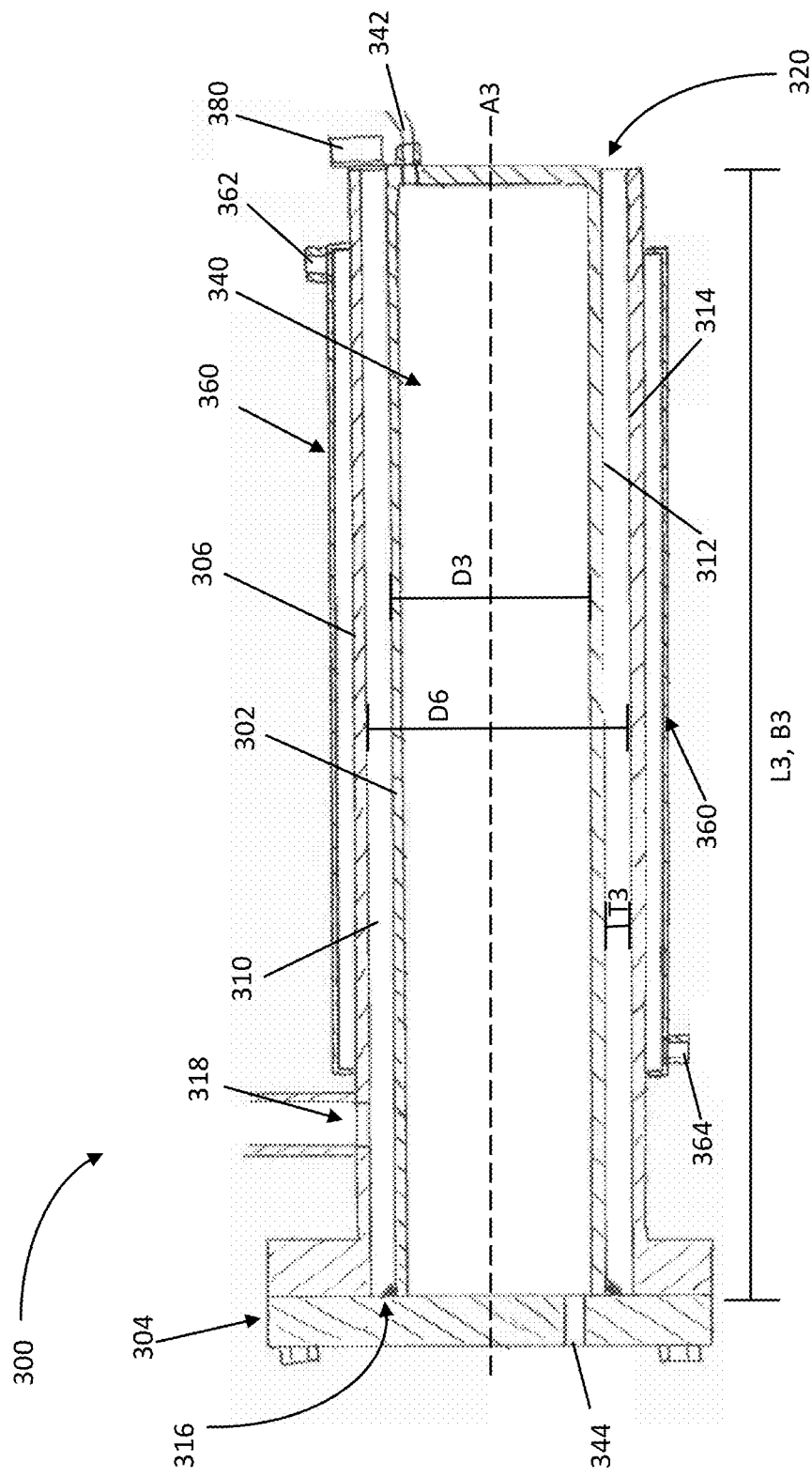
FIG. 3 shows a die according to an embodiment.

A stream can then be directed into a die. FIGS. 1-3 illustrate examples of a die 100, 200, 300 suitable for use in a method provided herein. Generally, a die 100, 200, 300 includes an inner portion 102, 202, 302 that extends along a central axis A1, A2, A3 Inner portion 102, 202, 302 has an inner diameter D1, D2, D3 as measured from side to side through central axis A1, A2, A3, and is stably housed within an outer portion 106, 206, 306 having an outer diameter D4, D5, D6 as measured from side to side through central axis A1, A2, A3, where the outer diameter D4, D5, D6 is larger than the inner diameter D1, D2, D3 Inner portion 102, 202, 302 can be supported within outer portion 106, 206, 306 using any appropriate component, such at least one leg (e.g., 1, 2, 3, 4, 5, or the like) 204, an attachment plate 304, or via a transition apparatus 500 at one or more points along the length of the die. In some embodiments, the inner portion can be supported by a component that is beyond the length of the outer portion.

Inner portion 102, 202, 302 and outer portion 106, 206, 306 are spaced so as to define an internal longitudinal channel 110, 210, 310 having a transverse cross section S1 that is a continuous loop along at least a part of the length L1, L2, L3 of the die. Inner portion 102, 202, 302 and outer portion 106, 206, 306 are arranged such that inner diameter D1, D2, D3 defines an inner surface 112, 212, 312 of channel 110, 210, 310, which is generally parallel with outer surface 114, 214, 314 defined by outer diameter D4, D5, D6. Internal longitudinal channel 110, 210, 310 has a gap thickness T1, T2, T3 defined by inner surface 112, 212, 312 and outer surface 114, 214, 314. Gap thickness T1, T2, T3 can remain the same, or change, throughout the length B1, B2, B3 of channel 110, 210, 310.

Internal longitudinal channel 110, 210, 310 has a first end 116, 216, 316 at or near which an inlet 118, 218, 318 inlet is position that is configured to deposit a stream comprising a proteinaceous composition into the channel 110, 210, 310. Internal longitudinal channel 110, 210, 310 also has a second end (i.e., exit) 120, 220, 320 from which an extruded protein product exits the channel 110, 210, 310. Internal longitudinal channel 110, 210, 310 has a length B1, B2, B3 as measured from inlet 118, 218, 318 to second end 120, 220, 320.

Suitable outer diameters of an internal longitudinal channel can be from about 130 to about 2500 mm (e.g., from about 160 mm to about 1200 mm, from about 200 mm to about 1000 mm, from about 250 mm to about 500 mm, from about 300 mm to about 450 mm, from about 325 mm to about 400 mm, and the like) Inner and outer diameters of an internal longitudinal channel can be adjusted as appropriate to provide a desired gap thickness T1, T2, T3. Gap thickness can be from about 2 mm to about 100 mm (e.g., about 5 mm to about 60 mm, 5 mm to 30 mm, and the like). In some embodiments, an inner and/or outer diameter can be adjusted in order to adjust a rate of production of an extruded protein product. For example, in some embodiments, an inner and outer diameter can be increased to increase the rate of production of an extruded protein product.

In some embodiments, a gap thickness can be selected in order to provide a desired cooling rate of a proteinaceous composition passing through the internal channel. For example, a smaller gap thickness can provide a faster cooling rate, while a larger gap thickness can provide a slower cooling rate. In some embodiments, a cooling rate can affect how fibers in a proteinaceous composition are oriented as they pass through an internal channel. In some embodiments, a cooling rate can be selected to provide a generally uniform orientation of fibers throughout the thickness of an extruded protein product produced from a proteinaceous composition, or to provide non uniform orientation near a surface of an extruded protein product as compared to an interior part of the extruded protein product.

In some embodiments, a gap thickness can be selected in order to provide a desired shear rate. A shear rate can affect fiber orientation of a proteinaceous composition as it passes through an internal channel. It is to be understood, however, that various factors other than gap thickness can also affect shear rate, such as temperature of the proteinaceous composition, ingredient content of the proteinaceous composition, materials comprising the inner and outer surfaces of the channel, and the like.

Figure 4:
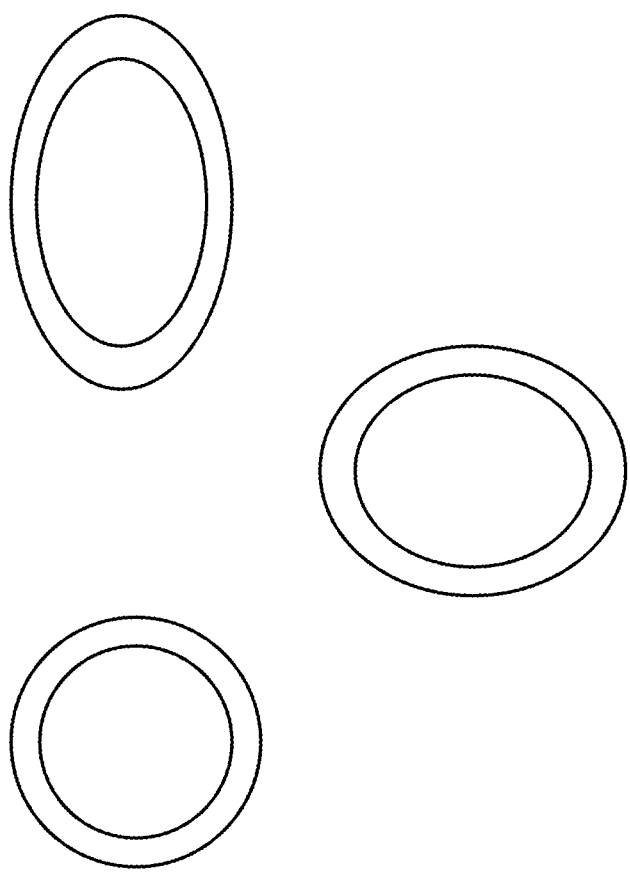
FIG. 4 shows representative continuous loop channel die cross sections according to embodiments of the invention.
Figure 5:
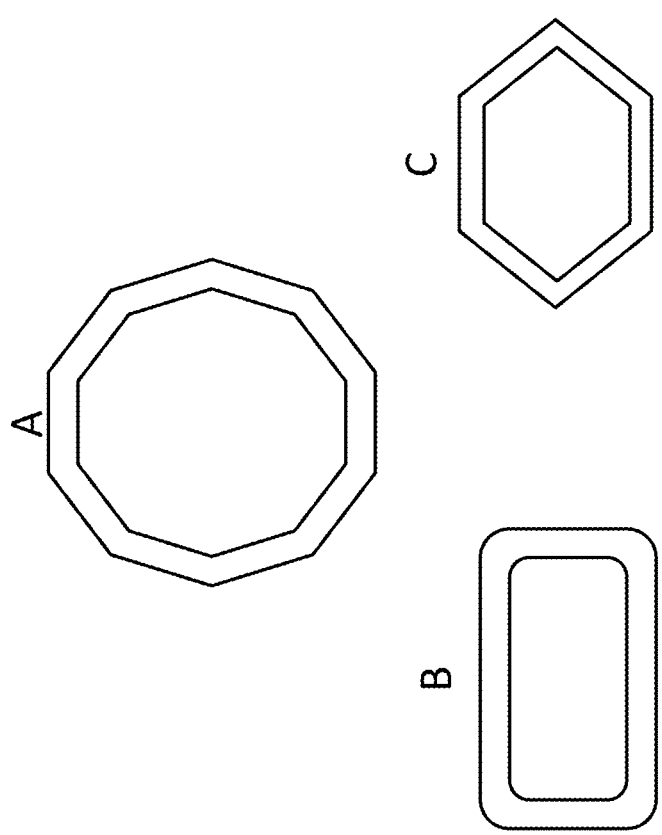
FIG. 5 shows representative continuous loop channel die cross sections according to embodiments of the invention.
Figure 6:
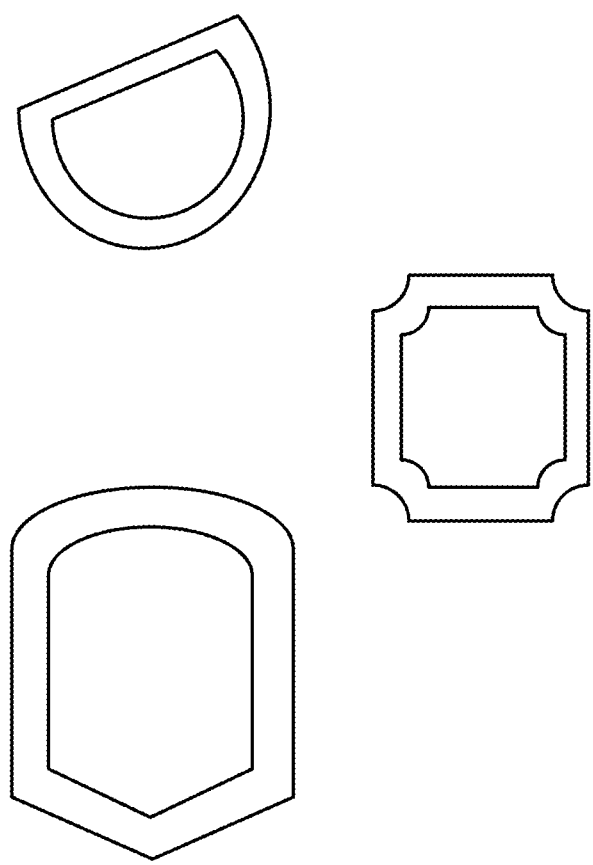
FIG. 6 shows representative continuous loop channel die cross sections according to embodiments of the invention.
Figure 7:
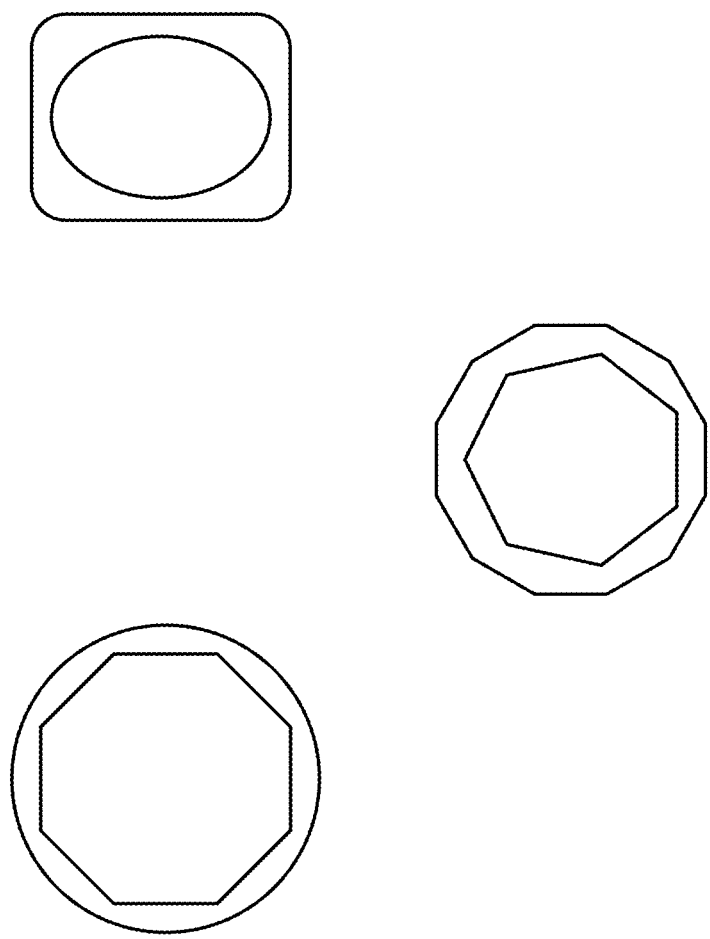
FIG. 7 shows representative continuous loop channel die cross sections according to embodiments of the invention.

A continuous loop of an internal longitudinal channel of a die can be a simple closed curve of any geometry, such as a generally elliptical shape (e.g., circular, ovoid, and the like; FIG. 4), a generally polygonal shape (e.g., rectangular, dodecahedral, and the like; FIG. 5), or an irregular shape (e.g., lamellar shape and the like; FIG. 6). As such, it is to be understood that a diameter, as described herein, refers to a distance from inner surface on one side of a channel to the inner surface of the other side of the channel as measured along a line that goes through the central axis of the channel (for an inner diameter) or from an outer surface on one side of a channel to the outer surface on the other side of the channel as measured along a line that goes through the central axis of the channel (for an outer diameter) as appropriate for the geometry of the channel. For instance, if a continuous loop of a channel is a simple closed curve of circular geometry, the diameter will be approximately the same from the axis to the inner surface of the channel at all points at a transverse cross section of the channel. In another example, if a continuous loop of a channel is a simple closed curve of a rectangular geometry, the diameter can vary from point to point along the inner surface of the channel at a transverse cross section of the channel. In some embodiments, the inner and outer surfaces of a channel can define different geometries (e.g., FIG. 7), as viewed from a transverse cross section of the channel. For example, the inner surface of a channel can define a circular geometry while the outer surface can define an octagonal geometry. It is to be understood that a channel having inner and outer surfaces with two different geometries should still define a gap thickness, though the gap thickness may vary at different points of the channel. In some embodiments, the cross section of the continuous loop of the channel can remain constant along the length of the channel. Generally, a simple closed curve geometry that reduces uneven shear created by sharp angles are more preferred. For example, a geometry having a generally elliptical shape, such as, for example, those shown in FIG. 4, or having only large angles, such as the geometry labeled "A" in FIG. 5, are more preferred to geometries labeled "B" or "C" in FIG. 5 or the geometries shown in FIGS. 6-7.

Internal longitudinal channel 110, 210, 310 is configured to orient fibers of a proteinaceous composition into a generally longitudinal orientation as the proteinaceous composition passes along the length B1, B2, B3 of the channel. A longitudinal channel 110, 210, 310 can have a length from about 50 cm to about 500 cm (e.g., from about 50 cm to about 460 cm, from about 100 cm to about 300 cm, from about 130 cm to about 200 cm, and the like) in length. A longitudinal channel length can be selected to provide a preferred residence time of a proteinaceous composition in the longitudinal channel. For example, a length of a longitudinal channel can be selected to provide a residence time of from about 10 seconds to about 1200 seconds (e.g., from about 30 seconds to about 600 seconds, from about 60 seconds to 300 seconds, about 160 seconds to about 240 seconds, and the like). Generally, a longer longitudinal channel can provide a longer residence time, while a shorter longitudinal channel can provide a shorter residence time. However, it is to be understood that residence time can be affected by various factors including, without limitation, flow rate and/or velocity of the proteinaceous composition and cooling die dimensions. A desired residence time in a longitudinal channel can be adjusted to provide conditions suitable for producing a desired texture of an extruded protein product produced from a proteinaceous composition.

In some embodiments, a ratio of channel length to gap thickness of from about 30:1 to about 1000:1 (e.g., from about 40:1 to about 240:1, from about 50:1 to about 160:1, about 60:1 to about 140:1, and the like) can be selected to configure an internal longitudinal channel 110, 210, 310 to orient fibers of a proteinaceous composition into a generally longitudinal direction. A ratio of channel length to gap thickness can be selected in order to provide a desired cooling rate, a desired residence time, and/or a desired shear rate in order to provide a desired texture of an extruded protein product. For example, a lower ratio (e.g., 30:1) generally would result in a faster cooling rate, while a higher ratio (e.g., 1000:1) would generally allow a slower cooling rate.

The surface texture, surface material, temperature, and length of a channel can be adjusted in order to provide the desired texture to an extruded protein product and/or to control the balance and/or flow of a proteinaceous composition in the channel. In order to control and/or adjust temperature of an internal longitudinal channel 110, 210, 310, a die 100, 200, 300 can include one or more cooling apparatuses 140, 160, 240, 260, 340, 360 along at least a portion of the length B1, B2, B3 of channel 110, 210, 310. In some embodiments, a die 100, 200, 300 includes a cooling apparatus 140, 240, 340 that cools inner surface 112, 212, 312. In some embodiments, a die 100, 200, 300 includes a cooling apparatus 160, 260, 360 that cools outer surface 114, 214, 314. A cooling apparatus can use any appropriate method to cool an inner surface and/or outer surface of an internal longitudinal channel. For example, a cooling fluid (e.g., water, alcohol, refrigerant, air, or the like; not shown) can be used in a cooling apparatus 140, 160, 240, 260, 340, 360 to cool inner surface 112, 212, 312 and/or outer surface 114, 214, 314. In some embodiments, at least a portion of a channel can be passed through a refrigerated chamber. In some embodiments, at least a portion of a channel is cooled by evaporation of a liquid. Although it is preferred that an inner surface and an outer surface be cooled at a similar rate, an inner surface and an outer surface need not be cooled in the same way or the same rate. For example, an inner surface and an outer surface can be cooled at different rates if a different texture is desired on one surface of an extruded protein product than on another surface of the extruded protein product.

In some embodiments, temperature can be different in different portions of a channel along its length in order to adjust the texture of an extruded protein product made by a method provided herein. For example, a channel 110, 210, 310 can be cooled to a lower temperature nearer second end 120, 220, 320 as compared to first end 116, 216, 316 and/or inlet 118, 218, 318 such that a proteinaceous composition becomes progressively cooler as it flows toward second end 120, 220, 320. A cooling apparatus 140, 160, 240, 260, 340, 360 can be configured as appropriate in order to provide the desired cooling effect, such as, for example, by including a cooling fluid inlet 142, 162, 242, 262, 342, 362 and a cooling fluid outlet 144, 164, 244, 264, 344, 364 positioned to provide the coolest cooling fluid where a lower temperature is desired and warmer cooling fluid where a warmer temperature is desired. In another example, multiple cooling apparatuses can be used to provide zone cooling along the inner and/or outer surfaces. In some embodiments, concurrent and countercurrent cooling fluid flow can be used in separate sections or zones.

In some embodiments, a channel can include a vent to allow excess moisture to escape and/or to release undesirable flavors from a protein composition. In some embodiments, the surface texture, surface material, and/or temperature can be different in different portions of a channel along its length in order to adjust the texture of an extruded protein product made by a method provided herein.

In some embodiments, a die can be modular in order to adjust the overall length of an internal longitudinal channel of a die provided herein, or to provide features to the die at a location along the length of the die. In some embodiments a module can include an additive port or a vent, or include a cooling apparatus. In some embodiments, different modules can have a channel with different surface textures and/or materials. In some embodiments, a modular die apparatus can include two or more modules that can be arranged as desired to result in a desired treatment of a stream.

In general, dimensions of various parts of a die and channel provided herein can be adjusted as appropriate for volume and/or rate of a stream being fed into the channel. For example, dimensions of a die can be adjusted to accommodate the capacity of an extruder that produces a stream being fed into the channel of the die. A modular die can provide the ability to adjust the dimensions of the dies, as desired.

In some embodiments, a temperature of a stream comprising a proteinaceous composition can enter a channel of a die at a temperature of from about 90° C. to about 180° C. (e.g., from about 100° C. to about 155° C., from about 115° C. to about 120° C., and the like). In some embodiments, a temperature of an extruded protein product as it exits a channel of a die can be from about 40° C. to about 110° C. (e.g., from about 55° C. to about 90° C., from about 70° C. to about 85° C., and the like). The cooling rate of a stream can be calculated based on the change in temperature of the stream between when it enters at the inlet of the die and when it exits the die and the residence time.

In some embodiments, a stream comprising a proteinaceous composition can be directed through a transition apparatus 500, 600 after exiting an extruder and before entering a die. A transition apparatus can include a component suitable for distributing a stream comprising a proteinaceous composition into a longitudinal channel with a transverse cross section being a continuous loop. In some embodiments, a transition apparatus can be configured to substantially evenly distribute a stream into the continuous loop of a channel. For example, in some embodiments, a transition apparatus can include a generally cone shaped or torpedo shaped apparatus to distribute the stream into a channel with a transverse cross section being a continuous loop. In some embodiments, a transition apparatus can be configured to split a stream into two or more substreams in order to distribute the stream into a channel with a transverse cross section being a continuous loop.

In some embodiments, a transition apparatus can include a structure (e.g., a spider leg mandrel) for supporting the inner portion of the die within the outer portion.

In some embodiments, a transition apparatus can include a means to pre-align fibers of a stream in order to facilitate texturization. Means for pre-aligning fibers of a stream include, but are not limited to, a breaker plate, a series of baffles, a laminar flow static mixer, and the like.

In some embodiments, a transition apparatus can include an additive port in order to add an additive to a proteinaceous composition prior to entering a longitudinal channel of a die. Any appropriate additive can be added to a proteinaceous composition in a method provided herein. For example, an additive can comprise one or more of an animal derived or non-animal derived lipid, a coloring agent (e.g., water soluble and/or oil soluble coloring agent), a hydrocolloid, a carbohydrate, an enzyme, a pH adjusting agent, a salt, a macronutrient, or a micronutrient.

In some embodiments, a stream comprising a proteinaceous composition can be run through a static mixer in a transition apparatus. The static mixer can be configured to at least partially mix an additive into the stream. In some embodiments, the static mixer can be configured to incompletely mix an additive into the stream. In some embodiments, incomplete mixture of an additive into the stream can result in a desired effect, such as a marbling effect. The additive can be one or more of a lipid, a coloring agent, a hydrocolloid, a carbohydrate, a softener or polyol, an enzyme, a pH adjusting agent, a salt, a macronutrient, or a micronutrient.

Examples of a lipid include, but are not limited to, fat (e.g., bee's wax, carnauba, lard, butter, palm fat, cocoa butter, and the like) and oil (e.g., canola oil, sunflower oil, olive oil, soy bean oil, sesame oil, cotton seed oil, rice bran oil, corn oil, peanut oil, safflower oil, fish oil, algae oil, krill oil, and the like).

Examples of a coloring agent include, but are not limited to, natural colors (e.g., caramel coloring, annatto, betanin, lycopene, beta carotene, cochineal extract, fruit extracts, vegetable extracts, and the like), artificial dyes (e.g., FD&C Blue No. 1, FD&C Blue No. 2, FD&C Green No. 3, FD&C Red No. 3, FD&C Red No. 40, FD&C Yellow No. 5, FD&C Yellow No. 6, and the like), lakes (e.g., carmine, and the like), and other additives that impart color (e.g., dihydroxyacetone, hydrogen peroxide, titanium dioxide, and the like).

Examples of a hydrocolloid include, but are not limited to, a pectin, a gum (e.g., xanthan gum, gum Arabic, gum ghatti, gum tragacanth, chicle gum, dammar gum, mastic gum, tara gum, spruce gum, psyllium seed husk, gellan gum, guar gum, locust bean gum, konjac gum, and the like), an alginate, a cellulose, an agar, and a carrageenan.

Examples of a carbohydrate include, but are not limited to, a native starch, a modified starch (e.g., pre-gelatinized, hybrid, modified, hydrolyzed, mechanically, chemically, thermally, enzymatically modified, modified by high pressure), a monosaccharide (e.g., glucose, fructose), an oligosaccharide (e.g., sucrose, lactose, maltose, maltodextrin), a soluble fiber (e.g., beta-glucan, inulin, fructan, polydextrose), an insoluble fiber (cellulose, hemicellulose, dextrin), and a modified fiber. A carbohydrate can be added as a purified carbohydrate or as part of an ingredient such as a grain (e.g., wheat, barley, corn, rice, rye, millet, oat, or the like) or pseudo grain (e.g., amaranth, quinoa, buckwheat, and the like) flour.

Examples of a softener or polyol include, but are not limited to sugar alcohols (e.g., glycerol, sorbitol), sugars, and propylene glycol.

Examples of an enzyme include, but are not limited to, a transglutaminase or other protein crosslinking enzyme, a peptide hydrolase, a lipase, an amylase, a protease, and a catalase.

Examples of a pH adjusting agent include, but are not limited to, an acid (e.g., citric acid, ascorbic acid, lactic acid, or other organic acid, or the like), a base (e.g., calcium hydroxide, sodium hydroxide, and the like), and a buffer.

Examples of a salt include, but are not limited to, organic salts (e.g., citrates, tartrates, sorbates, and the like) and inorganic salts (e.g., sodium chloride, magnesium chloride, calcium chloride, potassium chloride, bisulfites, metabisulfites, calcium phosphate, and the like).

Examples of a macronutrient include, but are not limited to carbohydrates, fats, protein, essential amino acids, and fatty acids. Examples of a micronutrient include, but are not limited to calcium, potassium, vitamins, organic acids, and the like.

In some embodiments, a transition apparatus can include other suitable components, such as a component for adjusting the dimensions of the stream before entering a die. For example, a stream can be changed from a substantially circular or FIG. 8 cross section to a rectangular cross section, or from a FIG. 8 cross section to a circular cross section. Additional suitable components can include cooling components, heating components, and the like.

Systems for performing the various methods described herein are also provided. A system for performing a method provided herein can include an extruder and a die apparatus having the features as generally described above. In some embodiments, a system can also include a transition apparatus as described above. Various embodiments of systems for producing an extruded protein product are illustrated in FIGS. 1-3.

FIG. 1 shows an embodiment of a system, in which transition apparatus 500 is configured to change the dimensions of a stream before dividing it into six substreams and directing it into channel 110.

FIG. 2 shows an embodiment of a system, in which a transition apparatus 600 that includes a generally conical section 620 configured to distribute a stream into channel 210. Die 200 is configured to include an inner portion 202 providing inner surface 212 that is supported by legs 204 within an outer portion 206, which provides outer surface 214.

FIG. 3 shows a system that does not include a transition apparatus. Die 300 includes an inner portion 302 providing inner surface 312 that is attached to an outer portion 306 via attachment plate 304 at first end 316 of channel 310. Inlet 318 is located near first end 316, which allows a stream comprising a proteinaceous composition to enter at or near the top of die 300 and flow around the continuous loop of channel 310 and toward second end 320.

A system provided herein can include any additional components suitable for producing an extruded protein product. For example, a system can include one or more cutters configured to cut an extruded protein product into a desired size or shape. A cutter can be included at or near the second end of a channel. In some embodiments, a cutter (e.g., as shown in FIGS. 2 and 3 as 280 (attached by mount 282), 380) can be a blade configured to cut an extruded protein product longitudinally just before, during, or after the extruded protein product exits a longitudinal channel of a die to produce a single, flat piece of extruded protein product or to produce multiple strips of an extruded protein product. In some embodiments, a cutter (e.g., a rotary blade) can be configured to cut an extruded protein product laterally at, or just after, the extruded protein product exits a longitudinal channel of a die.

EXAMPLES

Example 1

Tables 1-3 provide examples conditions and extrusion rates for several tests of a system similar to that illustrated in FIG. 3. A stream comprising a proteinaceous composition was produced with a moisture content of from about 53% to about 66% as shown, and a protein content (from soy protein concentrate or soy protein isolate) of about 20% to about 32%, based on the extruded product, and a carbohydrate content (from soy ingredients and other flours) of about 5% to about 9%, using a Buhler BCTG-62 extruder at a rate of about 446 kg/hr to about 1024 kg/hr, as shown. The stream was fed into a die having a channel with an inner diameter of about 30.2 cm, an outer diameter of about 32.7 cm, and a gap thickness of about 1.25 cm. The length of the die from the inlet to the exit was about 150 cm. Residence time of the stream in the extruder and the channel of the die was measured to be about 4 minutes, 20 seconds in Test 2. The residence times in the channel of the die for each test was calculated based on die dimensions, measured product density, and rate, and provided in Tables 1-3. Cooling water was fed into the inner jacket and outer jacket in concurrent flow. The inlet temperature for inner and outer cooling varied from about 10° C. to about 50° C., and the outlet temperature varied from about 50° C. to about 65° C., depending on product rate and other process conditions.

In each example, the extruded protein product had fibers oriented in a generally parallel orientation, resembling meat.

TABLE 1

| Parameter | Unit | Test 1 | Test 2 | Test 3 | Test 4 |
|---|---|---|---|---|---|
| Total Rate | Kg/hr | 446 | 460 | 473 | 495 |
| Proteinaceous Stream Composition | | | | | |
| Moisture | % | 53.2 | 53.7 | 54.0 | 54.5 |
| Oil | % | 7.1 | 7.9 | 8.6 | 9.6 |
| Carbohydrate | % | 9.4 | 9.2 | 8.9 | 8.5 |
| Protein | % | 25.8 | 25.1 | 24.3 | 23.3 |
| Extruder Parameters | | | | | |
| Screw Speed | Rpm | 918 | 918 | 918 | 918 |
| Barrel 2 Temp. | ° C. | 82.2 | 82.2 | 82.2 | 82.2 |
| Barrel 3 Temp. | ° C | 93.3 | 93.3 | 93.3 | 93.3 |
| Barrel 4 Temp. | ° C. | 98.9 | 98.9 | 98.9 | 98.9 |
| Barrel 5 Temp. | ° C. | 110.0 | 106.7 | 107.2 | 107.2 |
| Barrel 6 Temp. | ° C. | 112.8 | 109.4 | 110.0 | 110.0 |
| Barrel 7 Temp. | ° C. | 112.8 | 109.4 | 110.0 | 110.0 |
| Specific Mechanical Energy | Wh/kg | 77 | 70 | 65 | 58 |
| Extruder Die Parameters | | | | | |
| Composition Temp. | ° C. | 120.6 | 118.3 | 114.4 | 110 |
| Pressure | PSI | 345 | 331 | 312 | 292 |
| Calculated Residence Time | Min. | 3.17 | 3.08 | 2.99 | 2.86 |

TABLE 2

| Parameter | Unit | Test 5 | Test 6 | Test 7 | Test 8 | Test 9 |
|---|---|---|---|---|---|---|
| Total Rate | Kg/hr | 510 | 789 | 809 | 806 | 906 |
| Proteinaceous Stream Composition | | | | | | |
| Moisture | % | 61.3 | 61.4 | 61.0 | 61.4 | 65.6 |
| Oil | % | 4.0 | 4.1 | 4.0 | 4.0 | 3.6 |
| Carbohydrate | % | 8.2 | 8.2 | 8.2 | 8.2 | 7.3 |
| Protein | % | 22.6 | 22.4 | 22.4 | 22.5 | 20.0 |
| Extruder Parameters | | | | | | |
| Screw speed | Rpm | 918 | 813 | 820 | 919 | 918 |
| Barrel 2 Temp. | ° C. | 82.2 | 82.2 | 82.2 | 82.2 | 82.2 |
| Barrel 3 Temp. | ° C. | 93.3 | 93.3 | 93.3 | 93.3 | 93.3 |
| Barrel 4 Temp. | ° C. | 98.9 | 98.9 | 98.9 | 98.9 | 98.9 |
| Barrel 5 Temp. | ° C. | 106.7 | 128.9 | 126.7 | 126.7 | 126.7 |
| Barrel 6 Temp. | ° C. | 110.0 | 128.3 | 126.7 | 126.7 | 126.7 |
| Barrel 7 Temp. | ° C. | 110.0 | 128.3 | 126.7 | 126.7 | 126.7 |
| Specific Mechanical Energy | Wh/kg | 55 | 35 | 33 | 31 | 25 |
| Extruder Die Parameters | | | | | | |
| Composition Temp. | ° C. | 11.7 | 110.6 | 116.1 | 110.6 | 101.1 |
| Pressure | PSI | 206 | 250 | 237 | 215 | 192 |
| Calculated Residence Time | Min. | 2.77 | 1.80 | 1.75 | 1.76 | 1.56 |

TABLE 3

| Parameter | Unit | Test 10 | Test 11 | Test 12 | Test 13 | Test 14 | Test 15 |
|---|---|---|---|---|---|---|---|
| Total Rate | Kg/hr | 785 | 776 | 770 | 927 | 1024 | 692 |
| Proteinaceous Stream Composition | | | | | | | |
| Moisture | % | 60.4 | 59.9 | 59.6 | 59.7 | 58.1 | 55.0 |
| Oil | % | 4.1 | 4.2 | 4.2 | 4.2 | 4.3 | 4.7 |
| Carbohydrate | % | 8.4 | 8.5 | 8.6 | 8.6 | 8.9 | 4.7 |
| Protein | % | 23.1 | 23.4 | 23.5 | 23.5 | 24.4 | 31.8 |
| Extruder Parameters | | | | | | | |
| Screw Speed | Rpm | 918 | 918 | 918 | 918 | 918 | 918 |
| Barrel 2 Temp. | ° C. | 82.2 | 82.2 | 82.2 | 82.2 | 82.2 | 82.2 |
| Barrel 3 Temp. | ° C. | 93.3 | 93.3 | 93.3 | 93.3 | 93.3 | 93.3 |
| Barrel 4 Temp. | ° C. | 98.9 | 98.9 | 98.9 | 98.9 | 98.9 | 98.9 |
| Barrel 5 Temp. | ° C. | 156.7 | 142.2 | 146.1 | 151.7 | 161.1 | 151.7 |
| Barrel 6 Temp. | ° C. | 160.6 | 148.9 | 146.1 | 152.8 | 160.0 | 151.7 |
| Barrel 7 Temp. | ° C. | 159.4 | 142.2 | 146.1 | 151.7 | 160.6 | 151.7 |
| Specific Mechanical Energy | Wh/kg | 32 | 34 | 35 | 37 | 44 | 21 |
| Extruder Die Parameters | | | | | | | |
| Composition Temp. | ° C. | 116.1 | 118.3 | 118.3 | 115.0 | 116.1 | 124.4 |
| Pressure | PSI | 288 | 307 | 309 | 354 | 425 | 164 |

TABLE 3-continued

| Parameter | Unit | Test 10 | Test 11 | Test 12 | Test 13 | Test 14 | Test 15 |
|---|---|---|---|---|---|---|---|
| Calculated Residence Time | Min. | 1.80 | 1.83 | 1.84 | 1.53 | 1.38 | 2.05 |

Example 2

An extruded protein product is produced using each of Dies 1-8 (Table 4) having a longitudinal channel having a transverse cross-section that is a continuous loop with the parameters shown in Table 4. Briefly, a stream comprising a proteinaceous composition is produced using an extruder and directed into a die as specified in Table 4 to produce an extruded protein product having fibers oriented in a generally parallel orientation.

TABLE 4

| Parameter | Die 1 | Die 2 | Die 3 | Die 4 | Die 5 | Die 6 | Die 7 | Die 8 |
|---|---|---|---|---|---|---|---|---|
| Outer Diameter (mm) | 520 | 160 | 327 | 2500 | 2500 | 327 | 327 | 327 |
| Inner Diameter (mm) | 495 | 110 | 302 | 2475 | 2475 | 317 | 317 | 317 |
| Gap Thickness (mm) | 12.5 | 25.0 | 12.5 | 12.5 | 12.5 | 5.0 | 5.0 | 5.0 |
| Length (mm) | 380 | 740 | 620 | 1500 | 2800 | 1500 | 1500 | 3800 |
| Length:Gap Thickness | 30:1 | 30:1 | 50:1 | 120:1 | 224:1 | 300:1 | 300:1 | 760:1 |
| Total Rate (kg/hr) | 400 | 400 | 400 | 7000 | 13000 | 400 | 1025 | 1025 |

Example 3

A sample of extruded protein product produced using conditions similar to Test 14 of Example 1 was cut into a ½ inch strip in the direction of extrusion. The surface of the sample was stained with a 0.01% Rhodamine B solution to induce fluorescence of protein. The sample was imaged with an Olympus FV100 confocal microscope at 543 nm excitation and 555-655 nm collection under a 20× objective. Z stacks at 10 micron intervals were collected and digitally combined to visualize the surface topography of the sample. As shown in the photomicrographs in FIG. 8, the sample displayed protein that formed fibers that were oriented in a generally parallel orientation.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A system for producing an extruded protein product, the system comprising:
    an extruder configured to produce a stream comprising a proteinaceous composition having a protein component configured to form oriented fibers, the composition having a protein content of about 15% to about 90% based on dry weight of the composition, the stream having a moisture content of at least 27%; and
    an elongated die having an internal longitudinal channel configured to receive the stream from the extruder, the longitudinal channel having a length, an outer diameter, and an inner surface configured to be cooled by a cooling apparatus, the longitudinal channel having a generally constant transverse cross-section that is a continuous loop along substantially an entire length of the die, the channel having a length and a gap thickness configured to form oriented fibers from the protein component in a generally parallel orientation to produce the extruded protein product, the length of the channel to the gap thickness of the channel having a ratio between about 30:1 and about 1000:1, the outer diameter being between about 200 mm and about 750 mm and the gap thickness being between 5 mm and about 30 mm.

2. The system of claim 1, wherein the transverse cross-section is a simple closed curve.

3. The system of claim 2, wherein the transverse cross-section of the channel is substantially elliptical.

4. The system of claim 2, wherein the transverse cross-section of the channel is substantially circular.

5. The system of claim 1, wherein the channel has inner and outer surfaces that are substantially concentric.

6. The system of claim 1, wherein the ratio of the length of the channel to the gap thickness of the channel is between about 40:1 and about 240:1.

7. The system of claim 1, wherein the ratio of the length of the channel to the gap thickness of the channel is between about 50:1 and about 160:1.

8. The system of claim 1, wherein the ratio of the length of the channel to the gap thickness of the channel is between about 60:1 to about 140:1.

9. The system of claim 1, wherein the gap thickness of the channel is between about 10 mm and about 30 mm.

10. The system of claim 1, wherein the outer diameter of the channel is between about 200 mm and about 500 mm.

11. The system of claim 1, wherein the elongated die includes the cooling apparatus outside of the longitudinal channel.

12. The system of claim 1, wherein the moisture content of the proteinaceous composition is from about 27% to about 85%.

13. The system of claim 1, wherein the die is modular.

14. The system of claim 1, further comprising a transition apparatus between the extruder and the die.

15. The system of claim 14, wherein the transition apparatus is configured to substantially evenly distribute a stream into the continuous loop of the channel.

16. The system of claim 15, wherein the transition apparatus comprises a generally cone shaped apparatus to distribute the stream.

17. The system of claim 15, wherein the transition apparatus is configured to split a stream into two or more substreams in order to distribute the stream.

18. The system of claim 14, wherein the transition apparatus is configured to pre-align portions of the stream to facilitate texturization.

19. The system of claim 14, wherein the transition apparatus comprises a static mixer.

20. The system of claim 19, wherein the static mixer is configured to at least partially mix an additive into the stream.

21. The system of claim 20, wherein the static mixer is configured to incompletely mix the additive into the stream.

* * * * *